UNITED STATES PATENT OFFICE.

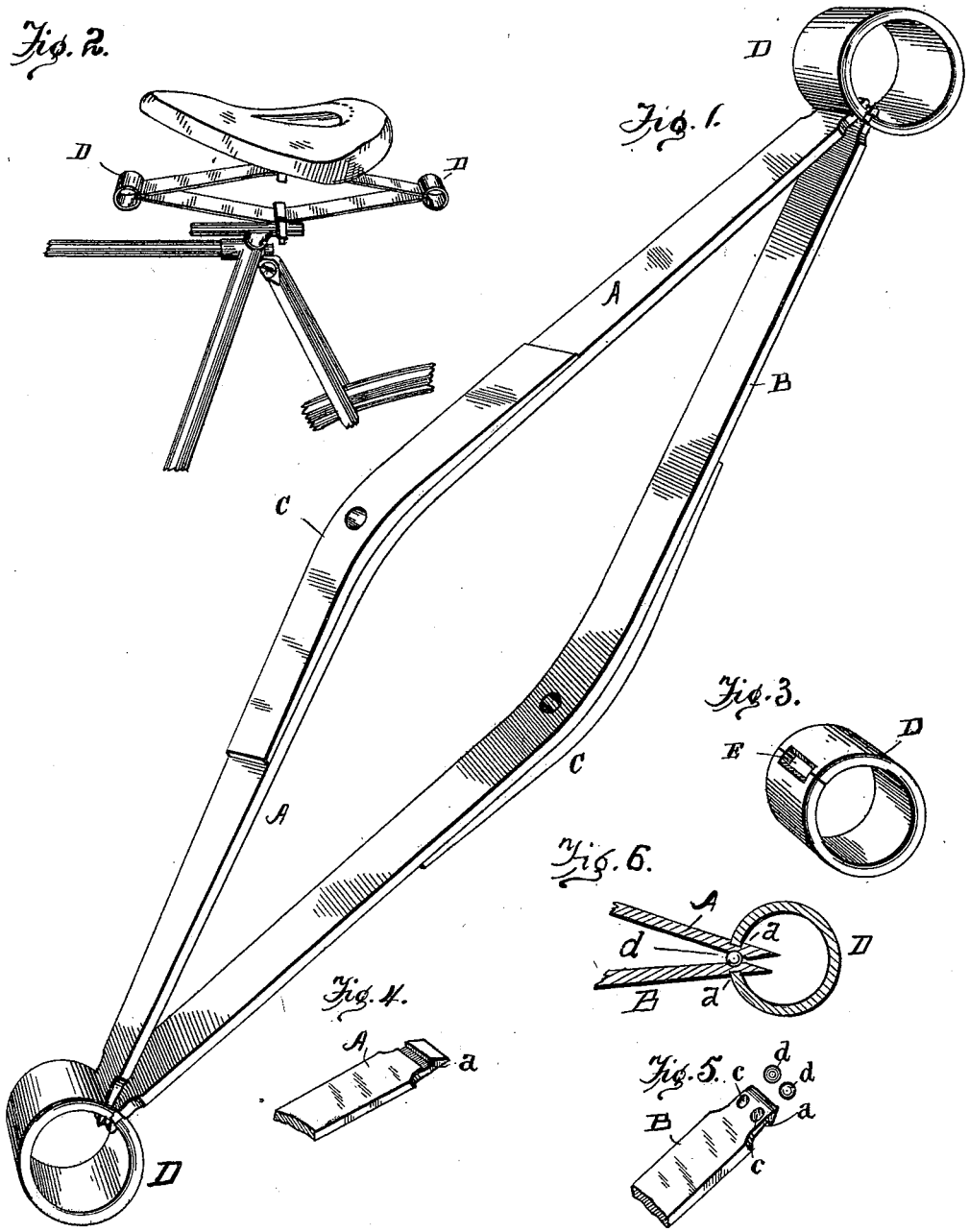

SOLOMON C. HITCHCOCK, OF TACOMA, WASHINGTON.

ELLIPTIC SPRING FOR VEHICLES.

SPECIFICATION forming part of Letters Patent No. 624,033, dated May 2, 1899.

Application filed August 10, 1898. Serial No. 688,288. (No model.)

*To all whom it may concern:*

Be it known that I, SOLOMON C. HITCHCOCK, a citizen of the United States, residing at Tacoma, in the county of Pierce and State of Washington, have invented certain new and useful Improvements in Elliptic Springs for Vehicles, of which the following is a specification, reference being had therein to the accompanying drawings.

This invention relates to elliptic springs well adapted to support the saddles of bicycles, but available for other vehicles and for other purposes.

The object of the invention is to produce a strong and flexible spring which can be made in sections and will operate with little noise or friction. The peculiar construction is hereinafter explained.

Figure 1 is a perspective view of the improved spring. Fig. 2 is a perspective of a bicycle-saddle and part of frame, showing improved spring applied. Fig. 3 is a detail perspective of one of the end rings of the spring. Fig. 4 is a broken detail of one face of one end of one of the spring-leaves. Fig. 5 is a similar detail of the other face of a leaf and the antifriction-balls. Fig. 6 is a detail section of the joint, showing relation of leaves, ring, and spreader.

A indicates one leaf of an elliptic spring, and B the other leaf. These leaves may be bent to the same or different curves and may be reinforced with other leaves C, as many as desirable, as is common in elliptic springs.

Near the ends of each leaf A B there is a transverse groove $a$ in each outer face of the leaves. In the inner face of each leaf there are recesses $c\,c$ a little less than hemispherical in form, and when the parts are assembled balls or spreaders $d\,d$ are placed in said recesses, which are about in line with the grooves $a$ in the leaves.

Split rings D D have recesses E along the split, said recesses being of a size to snugly receive the assembled leaves with the balls between them and close into grooves A. These rings are sprung over the ends of the assembled leaves and bite closely into grooves $a$. All the parts are preferably of steel.

When the spring is assembled, as shown in Fig. 1, the elasticity of the leaves makes a very perfect spring. The spring-rings D yield slightly under excess of pressure and will compensate for unequal flexibility of the leaves by a slight distortion of the form of the rings. The balls are nearly inclosed in the recess, but hold the leaves out of contact and prevent wear of the leaves.

The rings can be removed, so that the spring is separable and capable of quick repair, while the parts can be closely packed for shipment.

What I claim is—

1. An elliptic spring having top and bottom leaves with transverse outer grooves near their ends, the recessed spring-rings embracing the grooved ends of said leaves, and the spreaders interposed between the leaves.

2. The elliptic spring having top and bottom leaves with transverse grooves near their ends, and having nearly spherical recesses about in line with said grooves and between the leaves, and the split rings embracing the ends of said leaves and bearing in the transverse grooves thereof, all substantially as described.

In testimony whereof I affix my signature in presence of two witnesses.

SOLOMON C. HITCHCOCK.

Witnesses:
R. B. LEHMAN,
A. L. SWANSON.